US008930392B1

(12) United States Patent
Leichter

(10) Patent No.: US 8,930,392 B1
(45) Date of Patent: Jan. 6, 2015

(54) SIMULATED ANNEALING IN RECOMMENDATION SYSTEMS

(75) Inventor: Jerrold Leichter, Stamford, CT (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/489,338

(22) Filed: Jun. 5, 2012

(51) Int. Cl.
*G06F 17/00* (2006.01)
*G06F 17/30* (2006.01)

(52) U.S. Cl.
CPC ...... *G06F 17/3064* (2013.01); *G06F 17/30648* (2013.01)
USPC ............... 707/767; 707/723; 707/769

(58) Field of Classification Search
CPC ............ G06F 17/30867; G06F 17/30389; G06F 17/3064; G06F 17/30648; G06F 17/30687; G06F 17/30817; G06F 17/30828; G06F 17/30979; G06F 17/30991; G06F 17/30634–17/30719
USPC .................................................. 707/767–768
See application file for complete search history.

(56) References Cited

U.S. PATENT DOCUMENTS

| | | | |
|---|---|---|---|
| 6,130,938 A | 10/2000 | Erb | |
| 6,192,119 B1 | 2/2001 | Wilson | |
| 6,697,478 B1 | 2/2004 | Meldrum et al. | |
| 6,754,322 B1 | 6/2004 | Bushnell | |
| 7,106,848 B1 | 9/2006 | Barlow et al. | |
| 7,366,990 B2 | 4/2008 | Pitroda | |
| 7,555,110 B2 | 6/2009 | Dolan et al. | |
| 7,610,287 B1 | 10/2009 | Dean et al. | |
| 7,742,468 B2 | 6/2010 | Vagelos | |
| 8,001,152 B1 * | 8/2011 | Solan ............................ | 707/791 |
| 2002/0105550 A1 * | 8/2002 | Biebesheimer et al. ...... | 345/835 |
| 2002/0137490 A1 | 9/2002 | Gallant | |
| 2002/0143874 A1 | 10/2002 | Marquette et al. | |
| 2004/0258220 A1 | 12/2004 | Levine et al. | |
| 2005/0152521 A1 | 7/2005 | Liljestrand | |
| 2006/0026288 A1 | 2/2006 | Acharya et al. | |
| 2006/0077957 A1 | 4/2006 | Reddy et al. | |
| 2006/0206604 A1 | 9/2006 | O'Neil et al. | |
| 2007/0127631 A1 | 6/2007 | Difiglia | |
| 2007/0171898 A1 | 7/2007 | Salva | |
| 2007/0173236 A1 | 7/2007 | Vishwanathan et al. | |
| 2007/0233671 A1 * | 10/2007 | Oztekin et al. .................... | 707/5 |

(Continued)

FOREIGN PATENT DOCUMENTS

WO    WO02079984    10/2002

OTHER PUBLICATIONS

Radlinski et al. "Query Chains: Learning to Rank from Implicit Feedback", 2005 ACM.*

(Continued)

*Primary Examiner* — Polina Peach
(74) *Attorney, Agent, or Firm* — Patent Law Works LLP

(57) ABSTRACT

A system and method for generating suggestions to a user using simulated annealing is disclosed. The system includes a user activity processing unit, a recommendation engine, a ranking engine and a simulated annealing engine. The user activity processing unit receives user activities and generates user interests. The simulated annealing engine generates a temperature to control how far to stray from highly relevant suggestions. The recommendation engine generates a query for content and generates at least one suggestion for the user from received content. The ranking engine ranks the at least one suggestion based on a recency of user interests, frequency of actions associated with the user interests and social affinity of the user to other users that generated any of the at least one suggestions.

17 Claims, 10 Drawing Sheets

(56) References Cited

U.S. PATENT DOCUMENTS

| | | |
|---|---|---|
| 2007/0248077 A1 | 10/2007 | Mahle, Jr. et al. |
| 2008/0056475 A1 | 3/2008 | Brannick et al. |
| 2008/0114750 A1* | 5/2008 | Saxena et al. ............... 707/5 |
| 2008/0126303 A1* | 5/2008 | Park et al. ............... 707/3 |
| 2008/0192656 A1 | 8/2008 | Vagelos |
| 2009/0013002 A1* | 1/2009 | Eggink et al. ............ 707/104.1 |
| 2009/0024962 A1* | 1/2009 | Gotz ............... 715/838 |
| 2009/0187515 A1* | 7/2009 | Andrew et al. ............... 706/12 |
| 2010/0010913 A1* | 1/2010 | Pinckney et al. ............ 705/26 |
| 2010/0049766 A1* | 2/2010 | Sweeney et al. ............ 707/737 |
| 2011/0098156 A1 | 4/2011 | Ng et al. |
| 2011/0179019 A1* | 7/2011 | Amer-Yahia et al. ........ 707/723 |
| 2011/0252027 A1* | 10/2011 | Chen et al. ............... 707/728 |
| 2012/0042263 A1* | 2/2012 | Rapaport et al. ............ 715/753 |
| 2013/0325870 A1* | 12/2013 | Rouse et al. ............... 707/741 |

OTHER PUBLICATIONS

Adamic et al., "A Social Network Caught in the Web," Internet Journal, First Monday, Jun. 2, 2003, vol. 8, No. 6, pp. 1-22.

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support "Always On" Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, London, United Kingdom, pp. 252-255.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Networks," WPES '05, Alexandria, Virginia, Nov. 7, 2005, pp. 71-80.

Hammond et al., "Social Bookmarking Tools (I)," D-Lib Magazine, Apr. 2005, vol. II, No. 4, ISSN 1082-9873, 23 pgs.

Heer et al., "Vizster: Visualizing Online Social Networks," University of California, Berkeley, Oct. 23, 2005, 8 pgs.

International Search Report, International Application No. PCT/US2008/005118, Sep. 30, 2008, 2 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, [Retrieved on May 13, 2011], 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

O'Murchu et al., "Online Social and Business Networking Communities," Digital Enterprise Research Institute DERI Technical Report, National University of Ireland, Aug. 11, 2004, 22 pgs.

Ring Central, Inc., Internet, retrieved at http://www.ringcentral.com, Apr. 19, 2007, 1 pg.

Singh et al., "CINEMA: Columbia InterNet Extensible Multimedia Architecture," Department of Computer Science, Columbia University, May 2002, pp. 1-83.

Steen et al., "Development of we-centric, context-aware, adaptive mobile services requires empathy and dialogue," Freeband FRUX, Oct. 17, 2005, Internet Journal, Netherlands, pp. 1-4.

Superfeedr Track, Internet, retrieved at http://blog.superfeedr.com/tracl/filter/xmpp/pubsubhubbub/track, May 13, 2011, 8 pgs.

Twitter Blog: Tracking Twitter, Internet, retrieved at http://blog.twitter.com/2007/09/tracking-twitter.html, May 13, 2011, 2 pgs.

Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.

Van Eijk et al., "We-centric, context-aware, adaptive mobile service bundles," Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

* cited by examiner

SIMULATED ANNEALING IN RECOMMENDATION SYSTEMS

The specification relates to recommending suggestions to a user. In particular, the specification relates to recommending suggestions using simulated annealing.

BACKGROUND

Recommendation systems have become increasingly popular in the past few years. They are used in a variety of different domains, for example, for suggesting movies to watch, products to buy, music to listen to and people to connect with. Existing recommendation systems help users discover items that they might not have found by themselves. Existing recommendation systems, however, have numerous problems.

First, existing recommendation systems are good at providing relevant suggestions but they fail in providing surprising suggestions to the user. Second, existing recommendation systems are of limited usefulness because they provide purely relevant suggestions for things that the user is likely to already be aware of. For example, a system that recommends a book to a user because the user has read another book by the same author is not helpful because the user is probably already aware of the author's other books. What is needed is a system that provides better recommendations.

SUMMARY

According to one innovative aspect of the subject matter described in this disclosure, a system comprises a user activity processing unit receiving user activity and identifying a user interest from the user activity, a recommendation engine generating a query for content that includes the user interest, a simulated annealing engine receiving the content and generating at least one suggestion from the received content with subject matter that includes the user interest, the suggestion being surprising to the user based on its relevancy and a graphical user interface engine providing the at least one suggestion to the user.

In general, another innovative aspect of the subject matter described in this disclosure may be embodied in methods that include identifying a user interest from user activity associated with a user, generating a query for content that includes the user interest, receiving the content, generating at least one suggestion from the received content with subject matter that includes the user interest, the suggestion being surprising to the user based on its relevancy and providing the at least one suggestion to the user.

Other aspects include corresponding methods, systems, apparatus and computer program products. These and other implementations may each optionally include one or more of the following features. For instance, the features further include receiving positive feedback from the user based on the at least one suggestion and responsive to receiving the positive feedback, generating more surprising suggestions for the user. The operations further include receiving negative feedback from the user based on the at least one suggestion and responsive to receiving the negative feedback, generating more relevant suggestions for the user. In another example, the query for content includes the user interest and a level of recency for the content as compared to the user interest. In another example, the at least one suggestion is ranked based on a recency of user interests, frequency of actions associated with the user interests and social affinity of the user to other users that generated any of the at least one suggestions. The feedback is either implicit or explicit. In one instance, the feedback is implicit and the operations further comprise determining the feedback from at least one of time spent looking at the suggestions, the number of suggestions selected, relevance of the selected suggestions and the number of approvals or disapprovals of the selected suggestions. In another instance, the feedback is explicit and the operations further includes receiving explicit feedback from the user indicating that the at least one suggestion is too surprising and generating more relevant suggestions based on the explicit feedback. In one example, a probability of straying by a certain amount from a most relevant choice is an inverse exponential function.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

Figure 1:
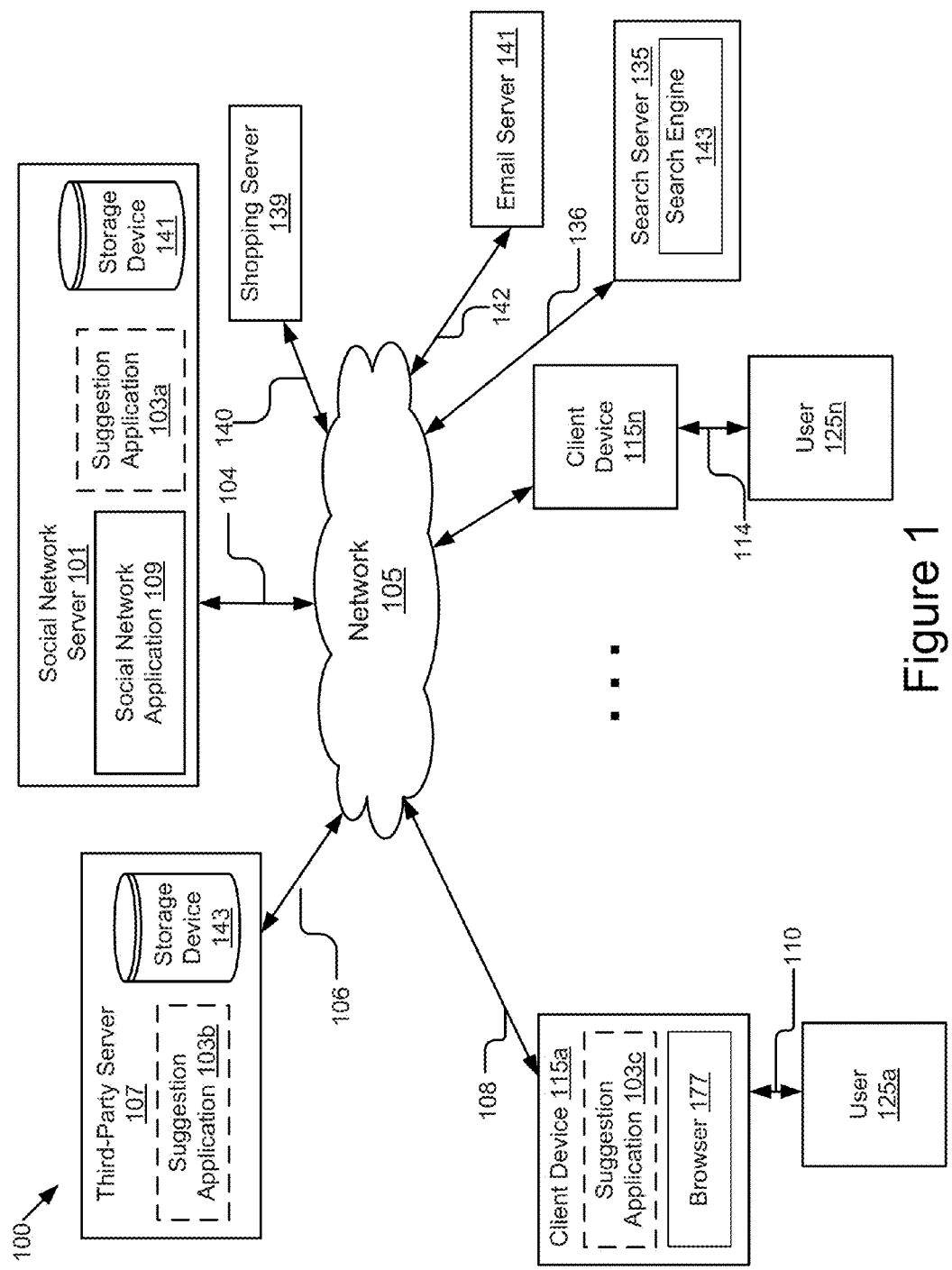
FIG. 1 is a high-level block diagram illustrating an example system for recommending suggestions using simulated annealing according to some instances.

FIG. 1 illustrates a block diagram of a system 100 for recommending suggestions using simulated annealing according to some instances. The illustrated description of a system 100 includes client devices 115a, 115n that are accessed by users 125a, 125n, a social network server 101, a third-party server 107, a search server 135 and a shopping server 139. In FIG. 1 and the remaining figures, a letter after a reference number, for example, "115a" is a reference to the element having that particular reference number. A reference number in the text without a following letter, for example, "115," is a general reference to any or all instances of the element bearing that reference number. In the illustrated instances, these entities are communicatively coupled via a network 105.

The client devices 115a, 115n in FIG. 1 are used by way of example. While FIG. 1 illustrates two devices, the description applies to any system architecture having one or more client devices. Furthermore, while only one network 105 is coupled to the client devices 115a, 115n, the social network server 101, the third-party server 107, the entertainment server 137, the search server 135 and the shopping server 139, in practice any number of networks 105 can be connected to the entities. Furthermore, while only one third-party server 107 is shown, the system 100 could include multiple third-party servers 107.

The network 105 is a conventional type, wired or wireless, and may have any number of configurations, for example, a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In other instances, the network 105 may be a peer-to-peer network. The network 105 may also be coupled to or includes portions of a telecommunications network for sending data in a variety of different communication protocols. For example, the network is a 3G network or a 4G network. In other instances, the network 105 includes Bluetooth communication networks or a cellular communications network for sending and receiving data, for example, via short messaging service (SMS), multimedia messaging service (MMS), hypertext transfer protocol (HTTP), direct data connection, WAP, email, etc.

The client device 115*a*, 115*n* is any computing device that includes a memory and a processor, for example, a personal computer, a laptop, a smart phone, a cellular phone, a personal digital assistant (PDA), etc. The user 125*a* interacts with the client device 115*a* as represented by signal line 110. Client device 115*n* and user 125*n* are coupled and interact in a similar manner.

The client device 115*a*, 115*n* comprises a browser 177. The browser 177 is code and routines stored in a non-transitory computer-readable memory of the client device 115*a*, 115*n* and is executed by a processor of the client device 115*a*, 115*n* for displaying data retrieved via the network 105. For example, the browser 177 is a browser application.

In some instances, the suggestion application 103*c* is stored on the client device 115*a*, which is communicatively coupled to the network 105 via signal line 108. If the client device 115*a* is a mobile device, for example, a smart phone, in some instances the suggestion application 103*c* is stored in part as a thin-client application that works with the browser 177 to generate a display and is stored in part on the social network server 101.

In other instances, the suggestion application 103*b* is stored on the third-party server 107, which is communicatively coupled to the network 105 via signal line 106. The third-party server 107 includes software for generating a website (not shown). In some instances, the suggestion application 103*b* generates a user interface that is incorporated into the website. In this instance, the suggestion application 103*b* can request information about social network users from the social network application 109. The information can be used to generate suggestions for the social network users.

In some instances, the suggestion application 103*a* is stored on the social network server 101, which is communicatively coupled to the network 105 via signal line 104. The social network server 101 comprises, among other things, a storage device 141 and a social network application 109. In some instances, the relationships between members associated with the social network application 109 are recorded in a social graph. In some examples, the social graph reflects a mapping of these users and how they are related. The social network includes a website for connected people to communicate with comments, posts, photos, forums, blogs, micro-blogs, etc. In some instances, the social network application 109 is a component of the suggestion application 103.

The storage device 141 is a non-transitory memory that stores data, for example, social data about the user 125*a*, 125*n*. The social data describes the user's 125*a*, 125*n* actions on one or more social networks and/or other information about the user 125*a*, 125*n*, for example, the user's 125*a*, 125*n* gender, age, education, past and present employers, geographic location, family members, friends and the actions of the user's 125*a*, 125*n* friends and family members on one or more social networks. In some instances, the social data can also include the user's 125*a*, 125*n* comments on updates by other users 125*a*, 125*n*. In other instances, the social data can be stored as a social graph in the storage device 141. In some instances, the social network server 101 additionally comprises one or more of a processor (not pictured), a clock (not pictured) used to generate timestamps for user comments and other components conventional to a hardware server device.

The suggestion application 103 receives activities of a user, generates a user profile that includes user interests and generates a set of suggestions that the user will find surprising and relevant. In some instances, the suggestion application 103 generates at least one suggestion based on the user activity data logged from a third-party server 107, a social network server 101, client devices 115*a*, 115*n*, a shopping server 139 that is coupled to the network 105 via signal line 140 and a search server 135 that is coupled to the network 105 via signal line 136. The shopping server 139 includes, for example, an application for facilitating the purchase of goods and/or services online. In some instances, the search server 135 includes a search engine 143 for retrieving results that match search terms from the Internet.

Figure 2A:
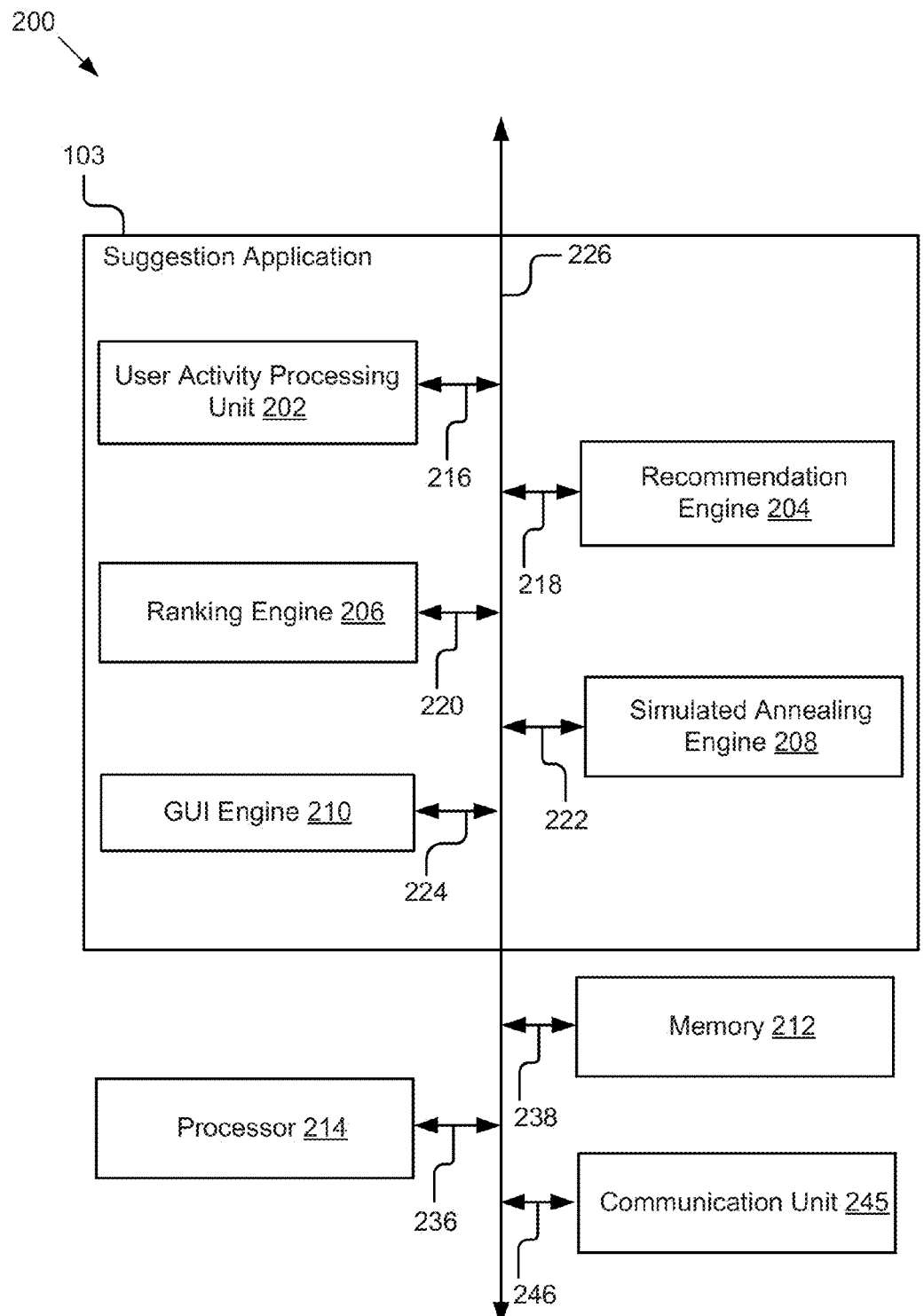
FIG. 2A is a block diagram illustrating an example suggestion application.

Referring now to FIG. 2*a*, the suggestion application 103 is shown in more detail. FIG. 2*a* is a block diagram of a computing device 200 that includes the suggestion application 103, a memory 212 and a processor 214. In some instances, the computing device 200 is a social network server 101. In some instances, the computing device 200 is a third-party server 107. In some instances, the computing device 200 is a client device 115*a*.

The processor 214 comprises an arithmetic logic unit, a microprocessor, a general purpose controller or some other processor array to perform computations and provide electronic display signals to a display device. The processor 214 is coupled to the bus 226 for communication with the other components via signal line 236. Processor 214 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2*a*, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 212 stores instructions and/or data that may be executed by processor 214. The memory 212 is coupled to the bus 226 for communication with the other components via signal line 238. The instructions and/or data may comprise code for performing any and/or all of the techniques described herein. The memory 212 may be a dynamic random access memory (DRAM) device, a static random access memory (SRAM) device, flash memory or some other memory device known in the art. In some instances, the memory 212 also includes a non-volatile memory or similar permanent storage device and media, for example, a hard disk drive, a floppy disk drive, a CD-ROM device, a DVD-ROM device, a DVD-RAM device, a DVD-RW device, a flash memory device, or some other mass storage device known in the art for storing information on a more permanent basis.

The communication unit 245 transmits and receives data to and from the computing device 200. The communication unit 245 is coupled to the bus 220 via signal line 246. In some instances, the communication unit 245 includes a port for direct physical connection to the computing device 200 or to another communication channel. For example, the communication unit 245 includes a USB, SD, CAT-5 or similar port for wired communication with the user device 115. In some instances, the communication unit 245 includes a wireless transceiver for exchanging data with the computing device 200 or any other communication channel using one or more wireless communication methods, such as IEEE 802.11, IEEE 802.16, BLUETOOTH® or another suitable wireless communication method.

In some instances, the communication unit 245 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In other instances, the communication unit 245 includes a wired port and a wireless transceiver. The communication unit 245 also provides other conventional connections to the network for distribution of files and/or media objects using standard network protocols such as TCP/IP, HTTP, HTTPS and SMTP as will be understood to those skilled in the art.

In some instances, the suggestion application 103 comprises a user activity processing unit 202, a recommendation engine 204, a ranking engine 206, a simulated annealing engine 208 and a graphical user interface (GUI) engine 210. The user activity processing unit 202 and engines 204, 206, 208 and 210 communicate with each other via the bus 226. The user activity processing unit 202 is communicatively coupled to the bus 226 via signal line 216. The recommendation engine 204 is communicatively coupled to the bus 226 via signal line 218. The ranking engine 206 is communicatively coupled to the bus 226 via signal line 220. The simulated annealing engine 208 is communicatively coupled to the bus 226 via signal line 222. The GUI engine 210 is communicatively coupled to the bus 226 via signal line 224.

The user activity processing unit 202 is code and routines for receiving user activities and for generating user interests that are included in a user profile. In some instances, the user activity processing unit 202 is a set of instructions executable by the processor 214 to provide the functionality described below for generating the user interests. In other instances, the user activity processing unit 202 is stored in the memory 212 of the computing device 200 and is accessible and executable by the processor 214. In either instance, the user activity processing unit 202 is adapted for cooperation and communication with the processor 214 and other components of the computing device 200 via signal line 216.

The user activity processing unit 202 obtains information about user activities from the user input and/or prior actions of the user across a range of data sources including search (for example, web, video, news, maps, alerts), entertainment (for example, news, video, movies, music, books, a personalized homepage, blogs, a reader, gadget subscriptions), social activity (for example, interactions through email, filling out a online vendor survey form, profile information, text messaging, for example, short message service (SMS), microblogs, geographical locations, comments on photos, a social graph and other social networking information) and activity on third-party sites (for example, websites that provide a capability for online shopping, ratings, reviews and social networks where users indicate that they approve of content). This information is obtained, for example, from a user's search history, browsing history, user profile and from other interactions on the Internet. The processing unit 202 generates user interests that are included in a user profile from the information gathered for each user. The user profile includes a list of the user's interests, for example, authors, movies, activities, books, television shows, clothing, public figures and friends in a social network. The user profiles are stored in the memory 212.

The recommendation engine 204 is software including routines for querying sources for content and determining a set of suggestions based on a comparison of the content with the user interests and transmitting the suggestions to the ranking engine 206. In some instances, the recommendation engine 204 is a set of instructions executable by the processor 214 to provide the functionality described below for generating a possible set of suggestions. In other instances, the recommendation engine 204 is stored in the memory 212 of the computing device 200 and is accessible and executable by the processor 214. In either instance, the recommendation engine 204 is adapted for cooperation and communication with the processor 214, the ranking engine 206, the user activity processing unit 202 and other components of the computing device 200 via signal line 218.

The recommendation engine 204 queries sources for content that the user might find interesting. The sources include content from third-party servers 107, social content from the social network application 109, information about goods and services from the shopping server 130 and websites from the search engine 143. The content from the third-party servers 107 includes, for example, news articles, videos, information from websites that rate businesses, etc. In one instance, the recommendation engine 204 queries the sources for content that is associated with the user interests. For example, the sources provide blog posts, photos, new articles, etc. that contain the user interest in the content itself or as a tag or keyword. The social content from the social network application 109 includes recommendations for people to follow, posts and photos to view, groups to join, etc.

In some instances, the recommendation engine 204 infers possible user interests for a user by accessing the user interests for many different users with similar characteristics to the user that are stored in the memory 212 by the user activity processing unit 202. The recommendation engine 204 collaborates and gleans information from several user profiles to identify user interests that might be of interest to the user. For example, if a user profile includes Irish history, poetry and philosophers from the enlightenment and other users with a similar user profile are also interested in British philosophers from the enlightenment, the recommendation engine 204 adds British philosophers from the enlightenment as a potential user interest. The recommendation engine 204 obtains user profile information from the user activity processing unit 202 and, in some instances, the social network application 109. In some instances, the recommendation engine 204 also identifies user interests of people associated with the user in a social network.

In some instances, if there is a social activity of sharing similar videos or commenting on a mutual friend's photo album between the user and his friends in the social network, the recommendation engine 204 identifies new people that the user would want to connect with who are possibly friends of friends in the social network. In another example, the recommendation engine 204 identifies products that the user might be interested in buying by accessing user profiles for people that bought the same product and exhibited similar shopping behavior. The information about users and products is received from the shopping server 139 or the social network application 109.

In some instances, the recommendation engine 204 develops models using data mining and machine learning algorithms to find patterns in the user activity received by the user activity processing unit 202. The models developed by the recommendation engine 204 are then used to infer a possible set of suggestions for the user. For example, the recommendation engine 204 can develop a Bayesian Network model that uncovers latent factors to improve inferring a specific set of suggestions.

In some instances, the recommendation engine 204 receives a temperature that reflects a degree of surprise from the simulated annealing engine 208. The recommendation engine 204 incorporates the temperature into the query for content. The degree of surprise is discussed in greater detail below with reference to the simulated annealing engine 208.

The ranking engine 206 is software including routines for ranking the set of possible suggestions received from the recommendation engine 204. In some instances, the ranking engine 206 is a set of instructions executable by the processor 214 to provide the functionality described below for ranking the suggestions. In other instances, the ranking engine 206 is stored in the memory 212 of the computing device 200 and is accessible and executable by the processor 214. In either instance, the ranking engine 206 is adapted for cooperation and communication with the processor 214, the recommendation engine 204, the simulated annealing engine 208 and other components of the computing device 200 via signal line 220.

The ranking engine 206 ranks the possible set of suggestions by relevance using different ranking algorithms. In some instances, the ranking engine 206 weighs the suggestions against the user interests in the user profile and the temperature to determine the relevance of the suggestions to be presented to the user. In other instances, the ranking engine 206 applies a higher weight to suggestions associated with more recent user interests to determine the relevance of the suggestions. For example, the user's current interest in a book that was purchased a year ago is more speculative than the user's current interest in a book that was purchased a week ago.

In another instance, the ranking engine 206 applies a weight to the suggestions based on the frequency that the user has performed an action associated with a user interest. For example, the user purchases books on hiking, generates posts about hiking and adds hiking as a recent user interest to the user's user profile. The user also posted a picture on the social network about cooking once. The ranking engine 206 applies a higher weight to suggestions associated with hiking than suggestions associated with cooking because the user activities indicate that the user is more interested in hiking than cooking.

In some instances, the ranking engine 206 applies a weight to suggestions based on the social affinity between the user and the person that generated the content. For example, if the content is a post generated by a person on a social network that the user follows, the user is more likely to be interested in reading the content than if the content was generated by an unaffiliated user. In some instances, the ranking engine 206 receives a social graph from the storage device 141 and uses the social graph to compute social affinity.

The simulated annealing engine 208 is software including routines for determining a temperature that reflects a degree of surprise associated with the set of suggestions for a user. In some instances, the simulated annealing engine 208 is a set of instructions executable by the processor 214 to provide the functionality described below for identifying a temperature that reflects a degree of surprise of the suggestions for the user. In other instances, the simulated annealing engine 208 is stored in the memory 212 of the computing device 200 and is accessible and executable by the processor 214. In either instance, the simulated annealing engine 208 is adapted for cooperation and communication with the processor 214, the ranking engine 206, the GUI engine 210 and other components of the computing device 200 via signal line 222.

The simulated annealing engine 208 is used for determining a parameter known as the temperature based on the feedback from the user which characterizes the varying degree of surprise in the suggestions presented to the user. The temperature determines the probability of straying by a certain amount from the most relevant choice. In some instances, the relationship between the temperature and the probability of straying by a certain amount is an inverse exponential function. The hotter the temperature, the more surprising the results. In some instances, the simulated annealing engine 208 uses implicit feedback from the user to modify the temperature. In other instances, the simulated annealing engine 208 uses explicit feedback from the user to modify the temperature. In some instances, the simulated annealing engine 208 generates a temperature and transmits the temperature to the recommendation engine 204 for incorporation into a query for content. In some other instances, the simulated annealing engine 208 receives the set of suggested content from the ranking engine 206 and reorders the content based on the temperature. The simulated annealing engine 208 is explained in greater detail with regard to FIG. 2B.

The GUI engine 210 is software including routines for generating graphical data for displaying a user interface that includes the suggestions received from the simulated annealing engine 208 to the user, allowing the user to view and define preferences for the suggestions and to provide feedback. In some instances, the GUI engine 210 is a set of instructions executable by the processor 214 to provide the functionality described below for generating graphical data for displaying a user interface. In other instances, the GUI engine 210 is stored in the memory 212 of the computing device 200 and is accessible and executable by the processor 214. In either instance, the GUI engine 210 is adapted for cooperation and communication with the processor 214, the simulated annealing engine 208, the user activity processing unit 202 and other components of the computing device 200 via signal line 224.

Figure 2B:
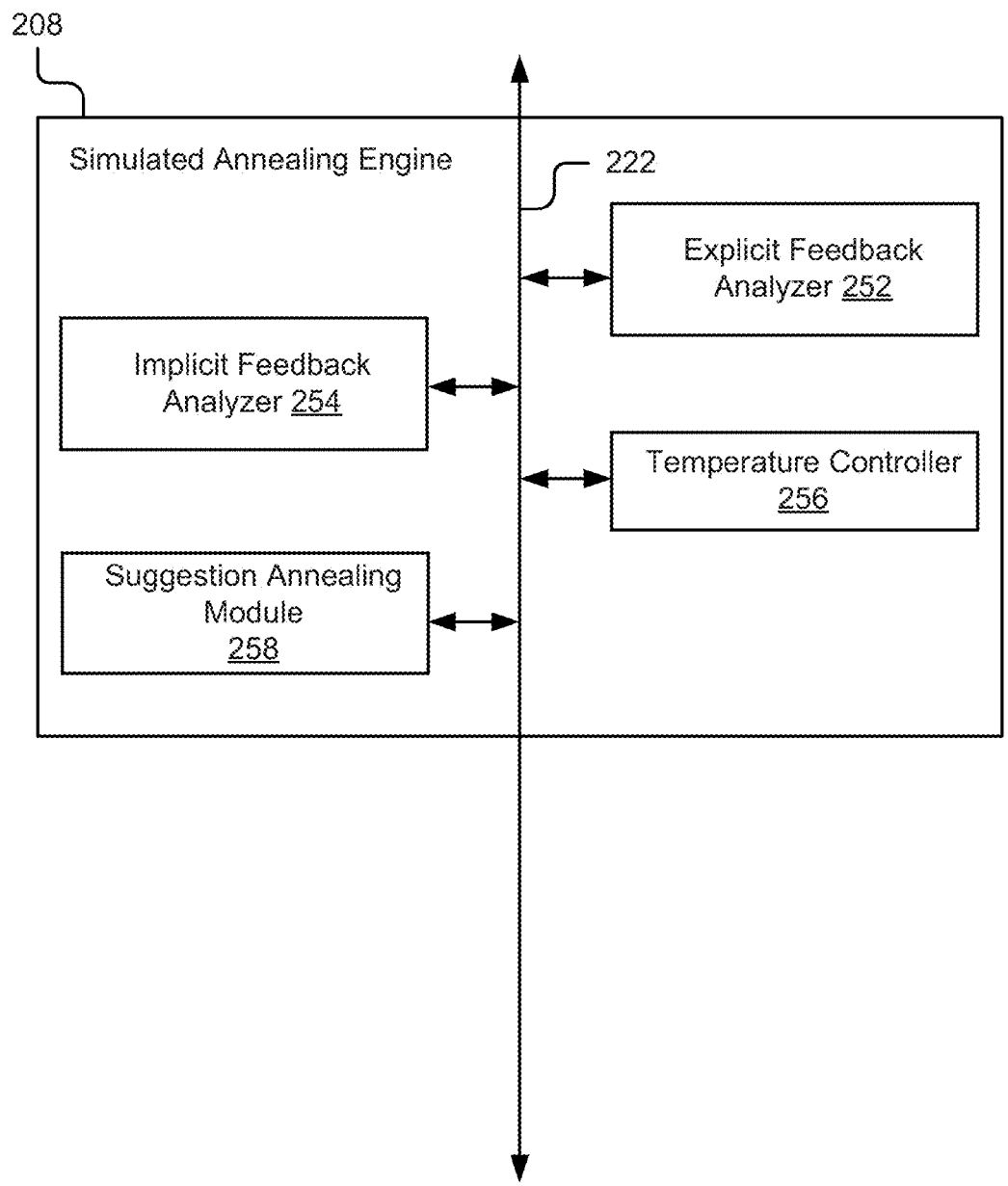
FIG. 2B is a block diagram illustrating an example simulated annealing engine.

Referring now to FIG. 2B, some instances of a simulated annealing engine 208 are shown in more detail. The simulated annealing engine 208 includes an explicit feedback analyzer 252, an implicit feedback analyzer 254, a temperature controller 256 and a suggestion annealing module 258 that are each coupled to signal line 222.

The explicit feedback analyzer 252 receives explicit user feedback, modifies the temperature and transmits an explicit signal corresponding to the feedback to the temperature controller 256. For example, upon displaying the set of suggestions, the explicit feedback analyzer 252 receives feedback from the user to increase or decrease the temperature when the user selects one of the two GUI buttons—"Surprise me!" or "Tone it down." In some instances, the explicit signal can be set by the user on his user profile prior to receiving the suggestions. For example, the explicit feedback analyzer 252 transmits an explicit signal to modify the temperature to the temperature controller 256 if the user has set up the feedback to correspond to "Surprise me!"

The implicit feedback analyzer 254 receives implicit user feedback, determines how the feedback affects the temperature and transmits an implicit signal corresponding to the feedback to the temperature controller 256. In some instances, the implicit feedback analyzer analyzes the amount of time the user spends looking at the suggestions (the less time spent, the more the temperature need to be raised), the number of suggestions looked at (the more suggestions that are viewed, the higher the temperature is raised), the actual relevance ratings of the suggestions (the more the least relevant suggestions are looked at, the higher the temperature is raised) and the number of selections of the suggestions and other similar indicators, for example, the purchasing of a product that was suggested indicates that the temperature is at the right level. In other instances, the implicit feedback includes the number of indications of approval or disapproval of the suggestions. Although these indications of approval or disapproval directly relate to the relevance of the suggestions, if a user consistently disapproves of highly relevant items, this is implicit feedback indicating that the temperature should be raised. The reverse of any of the above mentioned user activities denote lowering the temperature.

The temperature controller 256 receives the implicit and explicit signals corresponding to the feedbacks from the explicit feedback analyzer 252 and the implicit feedback analyzer 254, respectively, and uses the signals to either increase or decrease the temperature. In some instances, the temperature is measured on a spectrum, for example, one to 100. In other instances the feedback is normalized based on the number of previous pieces of feedback received and the feedback is stored in the memory 212. For example, if the temperature controller 256 previously received five pieces of feedback, a sixth piece changes the temperature more dramatically than if the temperature controller 256 previously receive 100 pieces of feedback. In some instances, the temperature controller 256 transmits the temperature to the recommendation engine 204 for incorporation into the query for content.

In some instances, the suggestion annealing module 258 receives the set of ranked suggestions from the ranking engine 206 and the temperature from the temperature controller 256 and selects suggestions for the user through a simulated annealing technique. In some instances, when suggestions for the user are picked from the set of ranked suggestions, the temperature determines the probability of straying by a certain amount from the most relevant choice for the user. For example, the higher the temperature is, the further the suggestions picked for the user stray from the most relevant choice. The temperature received from the temperature controller 256 is interpreted as characterizing how surprising the user wishes suggestions to be at a given time. The actual relationship between the temperature and the probability of straying is given by an inverse exponential function taken from thermodynamic theory.

Figure 2C:
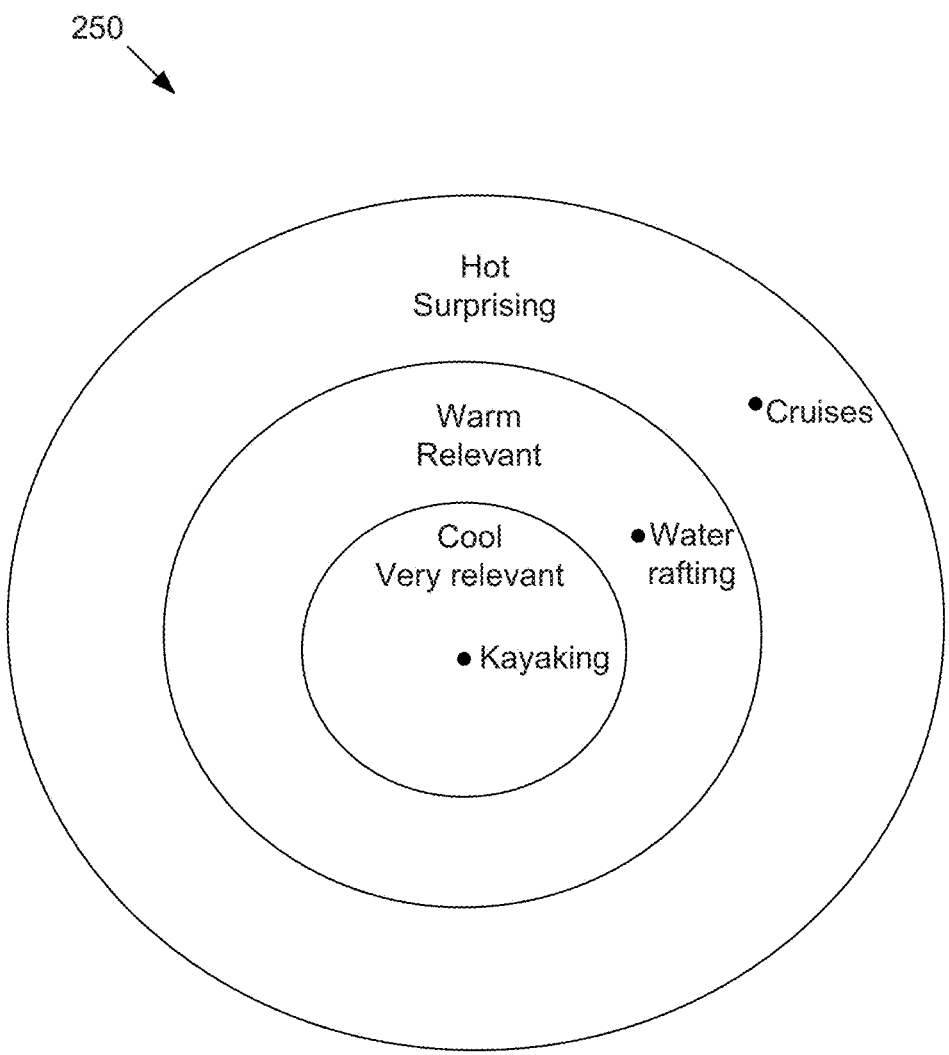
FIG. 2C is a graphical representation of an example of the correlation between relevant interests and temperature.

FIG. 2C illustrates a graphic representation 250 of the temperature for activities relating to the user interest of active water activities for a specific user according to some instances. The center of the circle represents interests that are both cool and very relevant. In this example kayaking satisfies the criteria of a user interest that is both cool and very relevant. Moving away from the circle results in hotter results, which are decreasingly relevant results. As a result, water rafting is hotter than kayaking but is still fairly cool. The most outward circle includes surprising topics that are hot, for example, cruises. Cruises are still relevant because kayaking and cruises involve water, but kayaking is a physical activity and cruises are leisure activities.

Figure 3A:
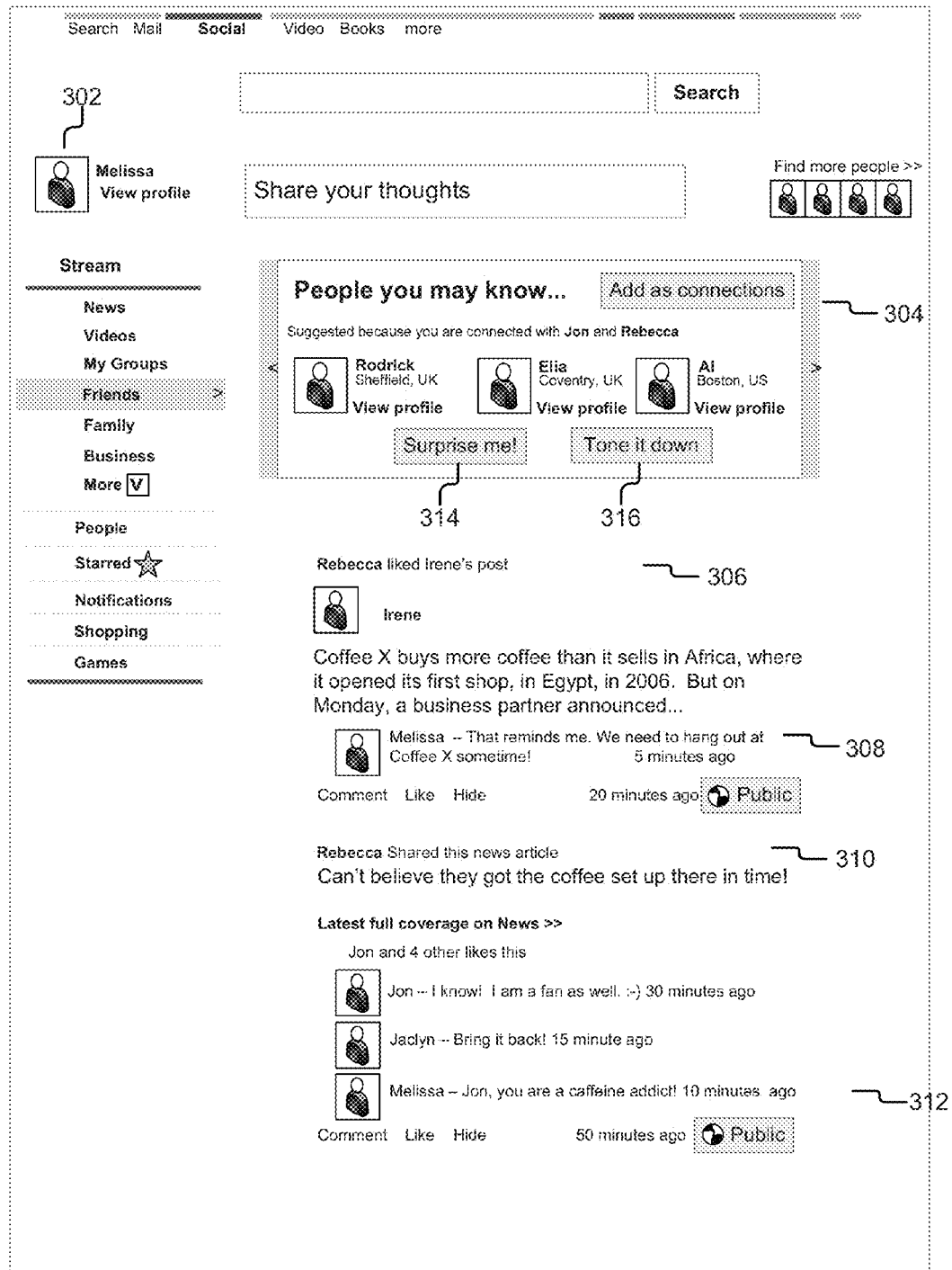
FIG. 3A is a graphical representation of an example user interface for recommending people as suggestions.

Turning now to the GUI engine 210, FIG. 3A is a graphic representation 300 of an interface generated by the GUI engine 210. In this example, the user interface 300 includes a social network profile 302 for the user Melissa, the suggestions 304 that are suggested for the user to connect with and social feeds 306, 310 of the user's friends. The social feeds 306, 310 include comments 308, 312 made by the user. The suggestions 304 also include a "Surprise me!" button 314 to increase the temperature of the suggestions and a "Tone it down" button 316 to increase the relevancy of the suggestions.

Figure 3B:
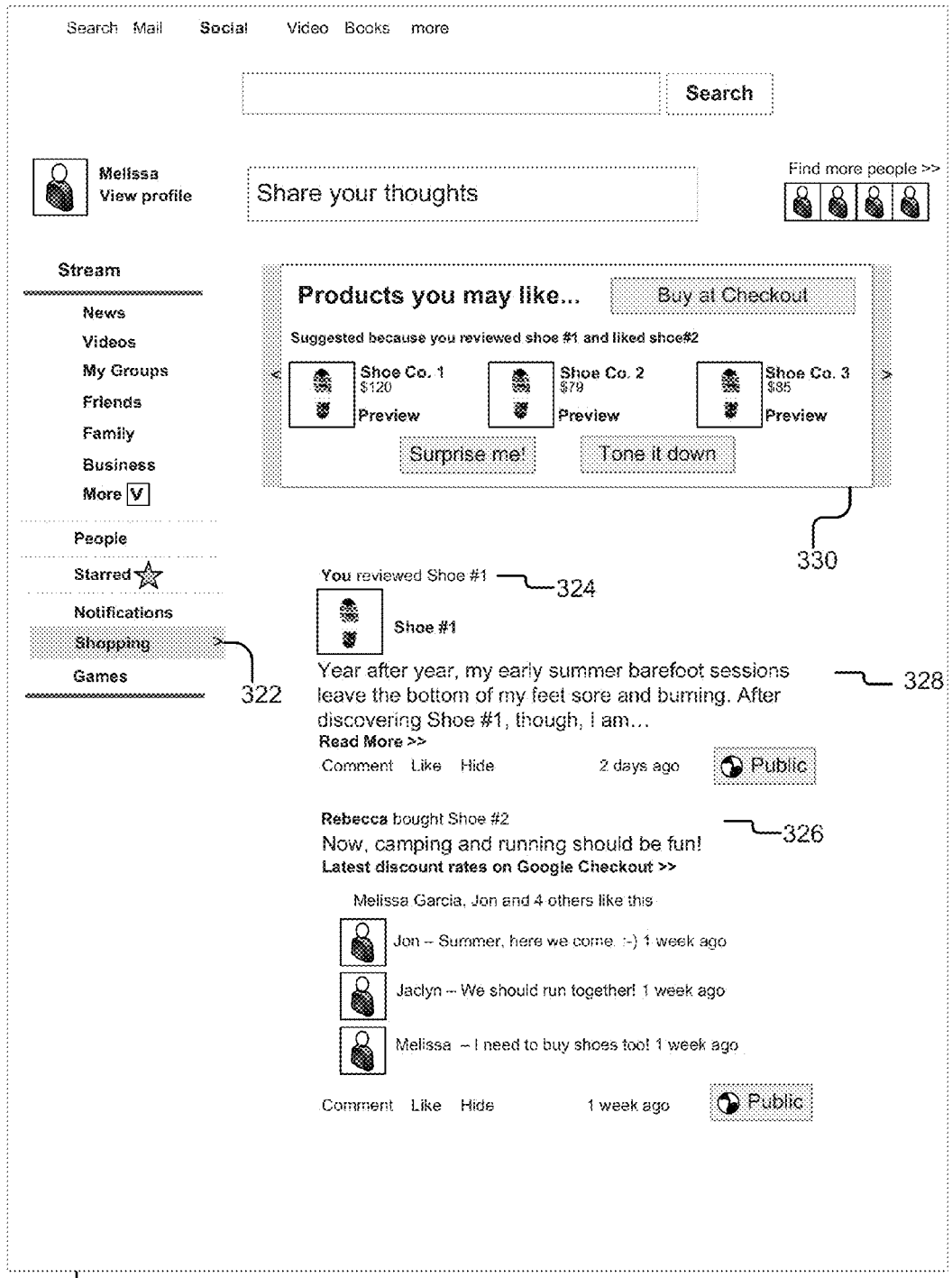
FIG. 3B is a graphical representation of an example user interface for recommending products as suggestions.

FIG. 3B is another graphic representation 350 of an interface generated by the GUI engine 210. In this example, the user interface includes a shopping subsection 322 in the user social network profile headers, a review 324 of a shoe product by the user and a comment 326 made by the user on a connected user's feed 328. The graphic representation 350 also includes shoe suggestions 330 that are presented to the user to buy in view of his recent interest in Shoe #1. The suggestions 330 also include buttons as shown previously in the first graphic representation to allow the user to explicitly change the temperature of the suggestions shown.

Figure 4:
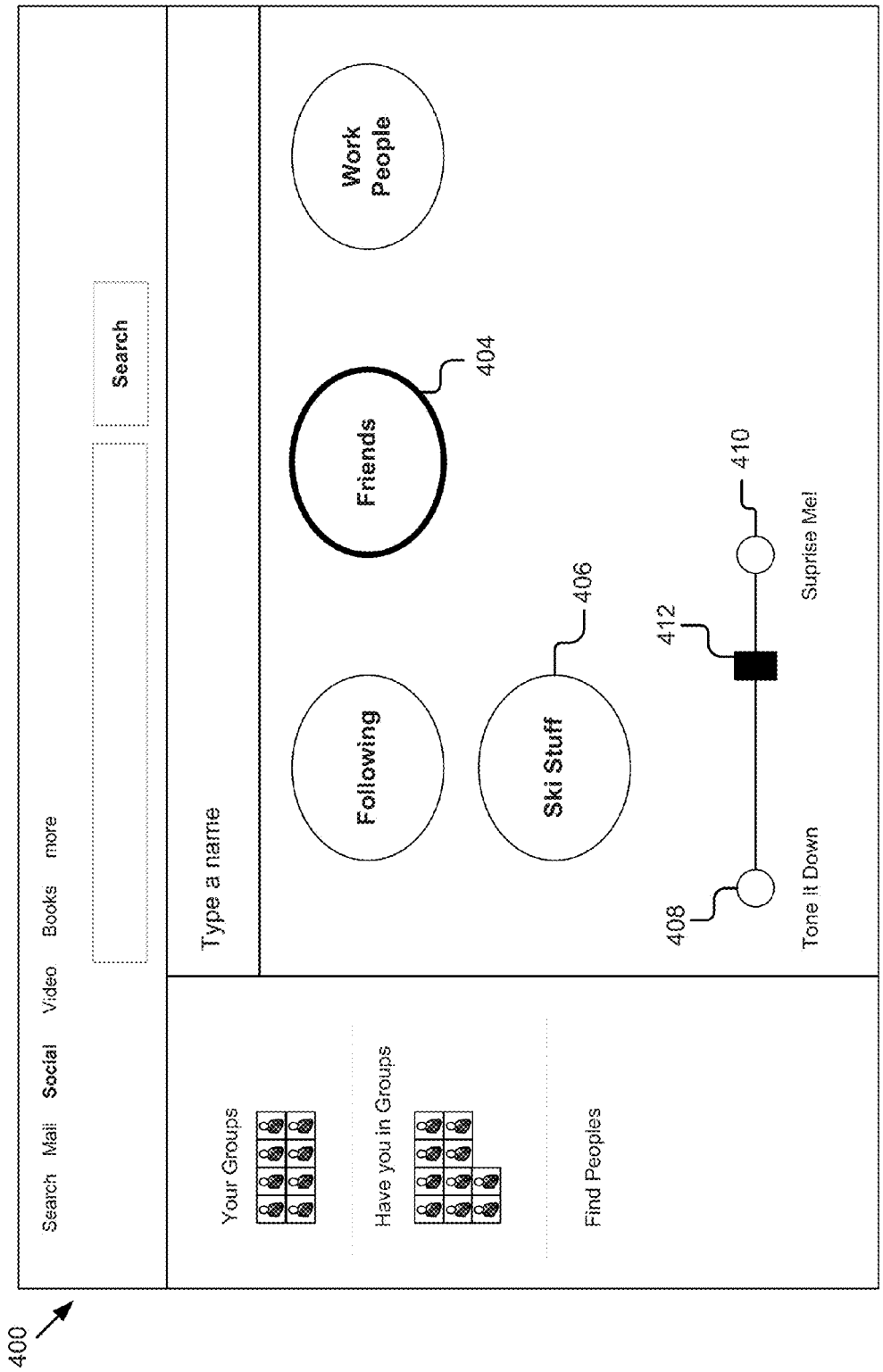
FIG. 4 is a graphical representation of an example user interface for defining a level of surprise for activity from people organized into groups.

In some instances, the suggestion application 103 controls the degree of influence of individual people or groups in a social network so that the user can customize the social network. FIG. 4 is an example instance of a user interface 400 for customizing groups in a social network according to the degree of influence. The user interface 400 includes different groups, such as a group of people that the user is following but does not know personally, a group of friends, a group of work people and a group of ski stuff 406. In one example, the suggestion application 103 sets a default temperature for a group and modifies the temperature in response to explicit or implicit user feedback. In another instance, the user can specify the temperature for a group. FIG. 4 includes an example of a sliding scale, where the user drags the bar 412 to move to the "Tone It Down" end 408 of the scale or move to the "Surprise Me!" end 410 of the scale.

In some instances, the temperature is also visually represented by, for example, a color or a thickness of a line surrounding the group. A green color could suggest cooler temperatures and a red color could suggest hotter and more surprising temperatures. Similarly, a thin line could reflect more relevant results and a thicker line could reflect more surprising results.

In some instances, the user activity processing unit 202 receives items from a social network application 109 associated with a group and a temperature in the social network application 109. In some instances, the items are received based on a query from the recommendation engine 204 for content from the social network application 109. In some other instances, the social network application 109 automatically transmits the items to the user activity processing unit 202, which forwards the content directly to the ranking engine 206. The ranking engine 206 ranks the items based on relevance, user interest, frequency and social affinity. The simulated annealing engine 208 chooses items to present to the user based on the temperature such that if the temperature is cool, high ranking items are presented more frequently than low ranking items. If the temperature is hot, more low ranking items are presented to the user.

Take, for example, the skiing example illustrated in FIG. 4. The user creates a group called "Ski Stuff" 406 that is populated with people who generate content about skiing. If the user is interested in skiing, recommendations from professional skiers about the best equipment to bring to a particular resort for a competition may be highly relevant to the user. Recommendations from amateurs, on the other hand, are not particularly relevant, though every once in awhile, they may have something useful to add. For example, they may live near the resort and post about local conditions. So the user does not want to completely ignore the content items from amateurs but does not want to receive the content items at the same level as posts from professional skiers. As a result, the user identifies a medium temperature for the group, which results in many posts from professional skiers and a scattering of posts from amateur skiers. In one instance, the ranking engine 206 helps achieve the proper balance because, for example, the ranking engine 206 applies a high weight to the content items from professional skiers because they are more relevant and match the user interests more closely. The content items from amateurs receive a lower ranking but are still present in the stream, although at a lower rate of frequency, because of the medium temperature selection.

Figure 5:
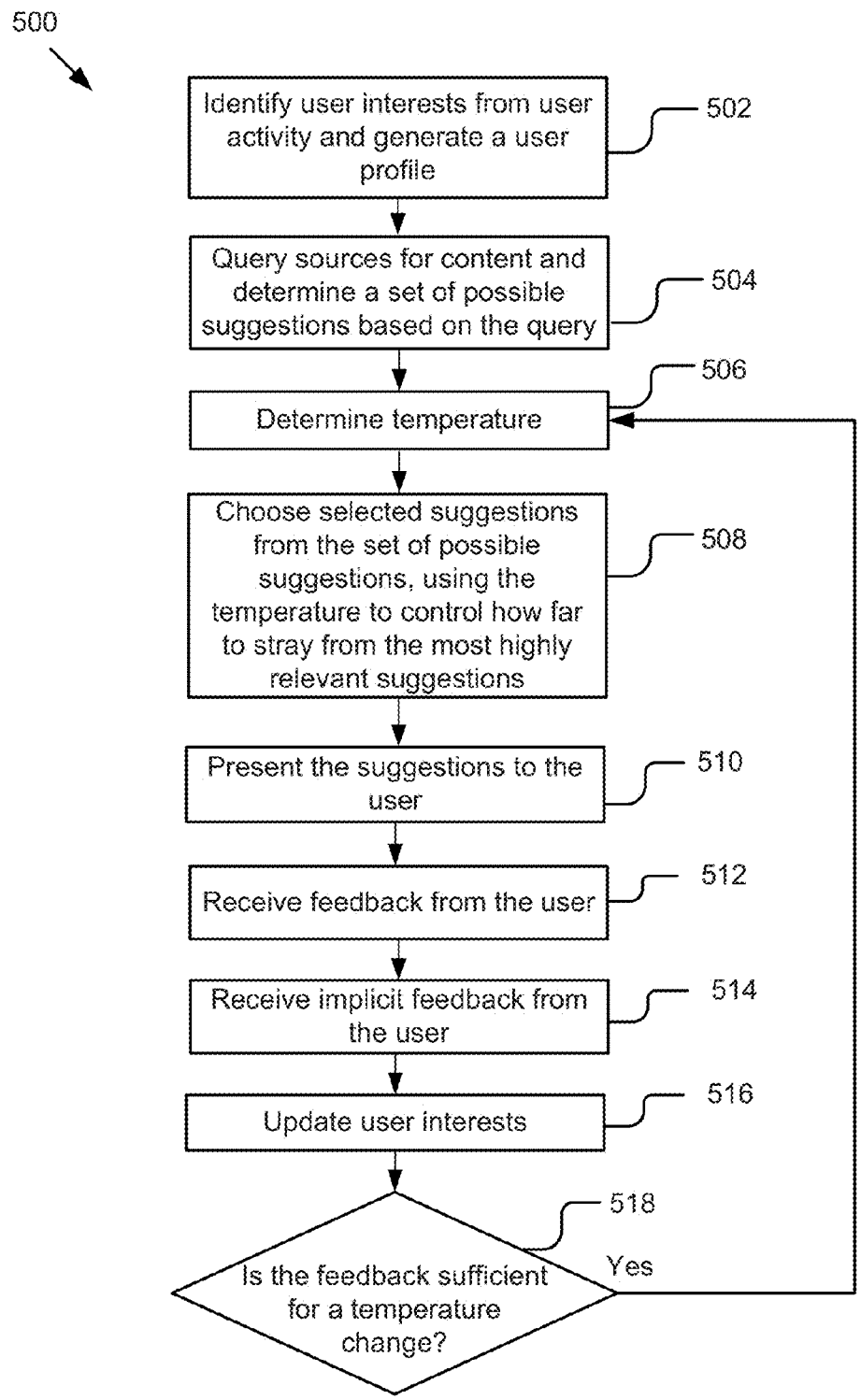
FIG. 5 is a flow diagram of an example method for recommending suggestions to a user using simulated annealing.
Figure 6:
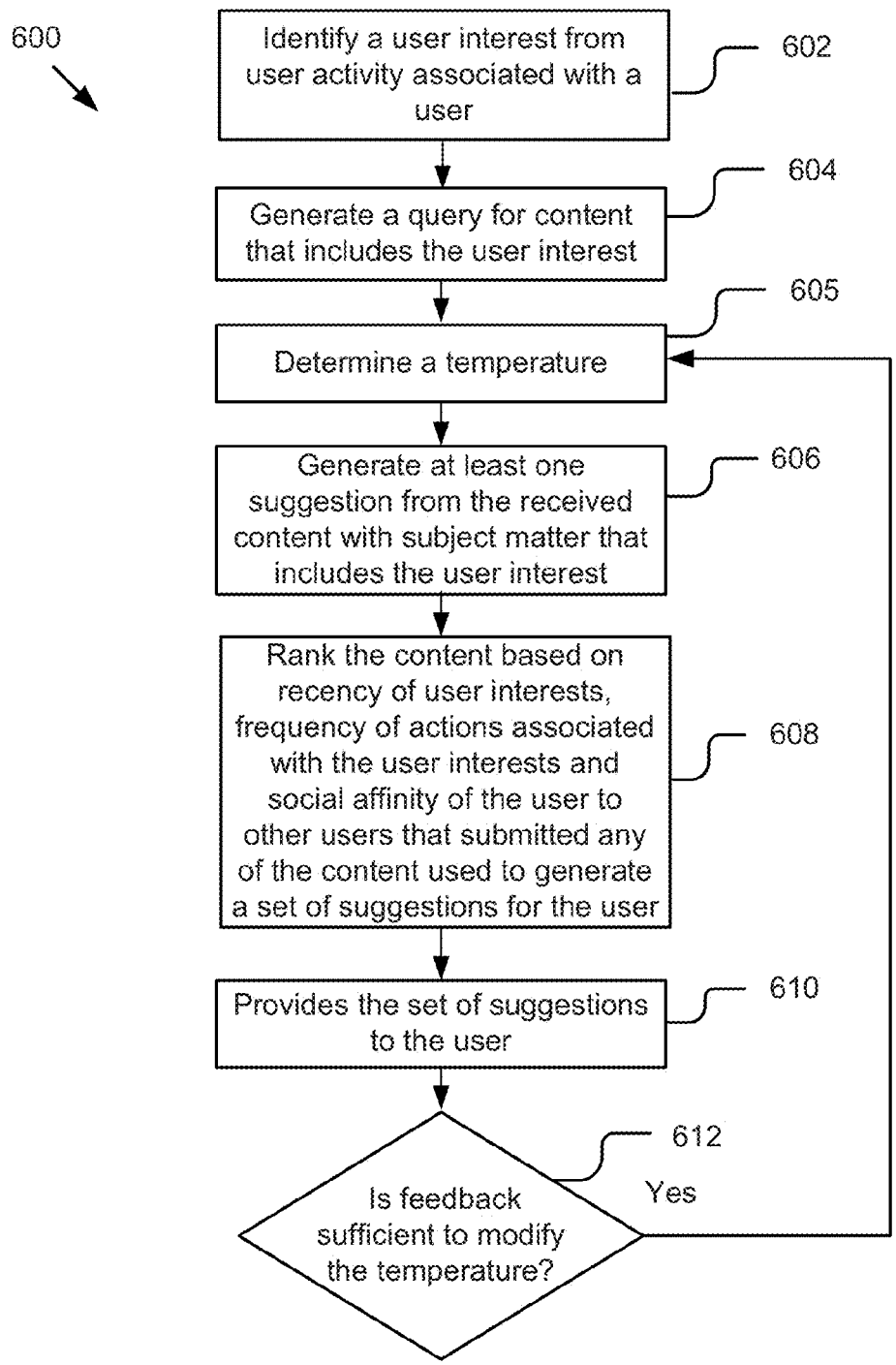
FIG. 6 is a flow diagram of another example method for recommending suggestions to a user that modifies the temperature based on explicit feedback.
Figure 7:
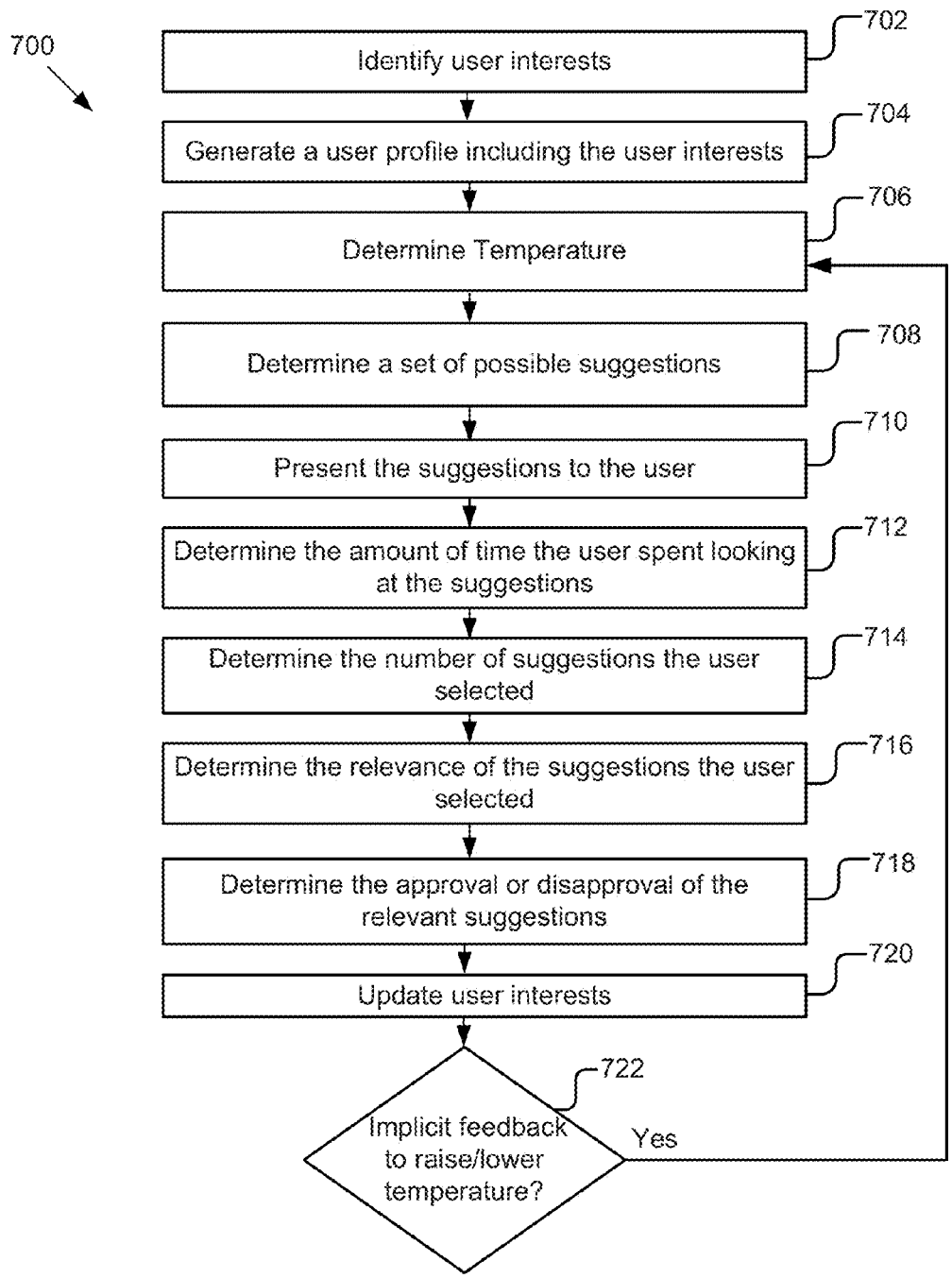
FIG. 7 is a flow diagram of an example method for recommending suggestions to a user that modifies the temperature based on implicit feedback.

Referring now to FIGS. 5-7, various instances of the method of the specification will be described. FIG. 5 is a flow diagram 500 of some instances of a method for generating suggestions for a user. In this instance, the suggestion application 103 includes a user activity processing unit 202, a recommendation engine 204, a ranking engine 206, a simulated annealing engine 208 and a GUI engine 210. The user activity processing unit 202 identifies 502 user interests from user activity and generates a user profile that includes the user activity. The recommendation engine 204 queries sources for content and determines a 504 set of possible suggestions based on the content. The recommendation engine 204 transmits the suggestions to the ranking engine 206, which ranks the suggestions according to relevance and frequency based on the user interests and social affinity.

The simulated annealing engine 208 includes a temperature controller 256, an explicit feedback analyzer 252, an implicit feedback analyzer 254 and a suggestion annealing module 258. The temperature controller 256 determines 506 a temperature. In some instances, the temperature controller 256 uses a center point of the user's interests as a starting point for the temperature and then modifies the temperature according to implicit and explicit feedback. The suggestion annealing module 258 chooses 508 selected suggestions from the set of possible suggestions, using the temperature to control how far to stray from the most highly relevant suggestions. For example, where a high temperature is selected, less relevant (lower ranked) suggestions appear more frequently then when a low temperature is selected.

The GUI engine 210 generates graphical data for presenting 510 the suggestions to the user by transmitting the suggestions to a client device 115 for display on a screen. The explicit feedback analyzer 252 receives 512 explicit feedbacks from the user to modify the temperature. The explicit feedback signal includes, for example, a user selection of a "surprise me" GUI button to raise the temperature or a user selection of a "tone it down" button to lower the temperature. The implicit feedback analyzer 254 receives 514 implicit feedbacks from the user to modify the temperature. The implicit feedback signal is determined by observing implicit user behavior including the amount of time the user spends looking at the suggestions, the number of suggestions viewed, the relevance ratings of the suggestions and approvals or disapprovals of suggestions indicated by the user.

The user activity processing unit 202 then updates 516 the user interests in the user profile stored for each user after receiving implicit or explicit feedback. If the explicit feedback analyzer 252 or the implicit feedback analyzer 254 determines 518 that the feedback is sufficient to request a temperature change in the feedback signals, then the temperature controller 256 determines 506 a new temperature based on the feedback received and the process repeats until the user is satisfied with the suggestions.

FIG. 6 is a flow diagram 600 of another instance of a method for generating suggestions for the user that modifies the temperature based on explicit feedback. In this instance, the suggestion application 103 includes a user activity processing unit 202, a recommendation engine 204, a ranking engine 206, a simulated annealing engine 208 and a GUI engine 210. The user activity processing unit 202 identifies 602 a user interest from user activity associated with a user and generates a user profile.

The recommendation engine 204 generates 604 a query for content that includes the user interest. The simulated annealing engine 208 determines 605 a temperature. In some instances the initial temperature is a default, for example, a warm temperature to see how the user reacts to slightly surprising content. The simulated annealing engine 208 generates 606 at least one suggestion from the received content with subject matter that includes the user interest based on the temperature, the suggestion being surprising to the user if the temperature is hot. The content is still subject matter that includes the same user interest that is associated with the user, but the simulated annealing engine 208 identifies less relevant content when the temperature is hot because it could be more interesting to the user. For example, where the user interest is kayaking, content about cruises is hot and surprising because content about cruises is less relevant than content about kayaking, but the content still involves an activity on the water so the content still involves the same subject matter. In some instances, these steps are reversed and the simulated annealing engine 208 determines a temperature for the content and the recommendation engine 204 incorporates the temperature (i.e., the relevancy of the requested content) into the query.

The recommendation engine 204 or the simulated annealing engine 208 transmits the content to the ranking engine 206 (depending upon the embodiment). The ranking engine 206 ranks 608 the content based on the recency of user interests, frequency of actions associated with the user interests and social affinity of the user to other users that submitted any of the content used to generate a set of suggestions for the user. The GUI engine 210 generates graphical data for displaying a user interface with the set of suggestions and provides 610 the set of suggestions to the user by transmitting the set of suggestions to the client device 115 for display on a screen.

The simulated annealing engine 208 receives explicit or implicit feedback from the user. The explicit feedback signal includes, for example, a "surprise me!" GUI button to raise the temperature or a "tone it down" button to lower the temperature. If the simulated annealing engine 208 determine 612 that the feedback is sufficient to modify the temperature, the simulated annealing engine 208 repeats the process of generating 606 at least one suggestion 604 of determining a temperature to control how far to stray from the most highly relevant suggestions. For example, if the user selects the "surprise me!" button a threshold number of time, the simulated annealing engine 208 modifies the temperature to provide more surprising results. The threshold helps normalize the reaction so that the temperature is not altered each time the user provides feedback. In some instances, however, the threshold is a single piece of feedback so that the simulated annealing engine 208 is very responsive to user feedback.

FIG. 7 is a flow diagram 700 of another instance of a method for generating suggestions for the user that modifies the temperature based on implicit feedback. The user activity processing unit 202 identifies 702 user interests and generates 704 a user profile that includes the user interests. The temperature controller 256 determines 706 a temperature and transmits the temperature to the recommendation engine 204. The temperature is a measure of the relevancy of the suggested content as compared to the user interests. The recommendation engine 204 determines 708 a set of possible suggestions. In some instances, the recommendation engine 204 incorporates the temperature into a query and queries for content. In some instances, the recommendation engine 204 queries for content and the suggestion annealing module 258 modifies the set of suggestions according to the temperature. The GUI engine 210 generates graphical data for displaying the user interface and presents 710 the suggestions to the user by transmitting the suggestions to a client device 115 for display on a screen.

The implicit feedback analyzer 254 receives implicit feedback from the user to modify the temperature. The implicit feedback signal is determined by observing implicit user behavior including the implicit feedback analyzer 254 determining 712 the amount of time the user spends looking at the suggestions, determining 714 the number of suggestions looked at, determining 716 the actual relevance ratings of the suggestions and determining 718 approval or disapproval of the relevant suggestions submitted by the user. Depending upon the type of implicit feedback received, the user activity processing unit 202 updates 720 the user interests that are part of the user profile stored in the memory 212. For example, if the user reacts positively to the suggestions and starts searching for additional content with the same subject matter as the suggestion, the user activity processing unit 202 adds the subject matter as a user interest to the user profile. If the implicit feedback analyzer 254 determines 722 that the implicit feedback is sufficient to raise or lower the temperature, then the temperature controller 256 determines 706 a new temperature based on the feedback received.

In the above description, for purposes of explanation, numerous specific details are set forth in order to provide a thorough understanding of the specification. It will be apparent, however, to one skilled in the art that the technology described in the various example instances can be practiced without these specific details. In other instances, structures and devices are shown in block diagram form in order to avoid obscuring the description. For example, the specification is described in some instances below with reference to user interfaces and particular hardware. However, the disclosure applies to any type of computing device that can receive data and commands, and any peripheral devices providing services.

Reference in the specification to "one instance," "an embodiment" or "an example embodiment" means that a particular feature, structure, or characteristic described in connection with the embodiment is included in at least one instance of the description. The appearances of the phrase "in one instance" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms, for example, "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In a preferred embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method comprising:
   identifying, by one or more processors, a plurality of user interests from user activity associated with a user;
   applying a weight to each of the user interests based on a frequency of user activity related to each of the user interests;
   generating, by one or more processors, groups on a social network for the user, at least a first group from the set of the groups including a user interest;
   generating, by the one or more processors, a query for content for the first group that includes the user interest;
   receiving, by the one or more processors, the content for the first group;
   generating, by the one or more processors, a set of ranked suggestions from the content for the first group based on relevancy to the user interest, the weight of the user interest and explicit feedback from the user, the explicit feedback including a first setting for how much the user wants a suggestion to stray from a center point of relevant choices, the first setting being different from a second setting provided by the user for a second group from the set of groups;
   providing, by the one or more processors, at least one first suggestion from the set of ranked suggestions to the user;
   receiving implicit feedback from the user in response to providing the at least one first suggestion, the implicit feedback including positive feedback; and
   responsive to receiving the positive feedback, providing at least one second suggestion from the set of ranked suggestions to the user that stray from the center point of relevant choices for the user.

2. The method of claim 1 further comprising:
   wherein the implicit feedback is negative feedback from the user based on the at least one first suggestion; and
   responsive to receiving the negative feedback, providing the at least one second suggestion for the user that is closer to the center point of relevant choices for the user.

3. The method of claim 1 wherein the query for content includes the user interest and a level of relevancy for the content as compared to the user interest.

4. The method of claim 1 wherein the set of ranked suggestions is also based on at least one of a recency of user interests, frequency of actions associated with the user interests and social affinity of the user to other users that generated any of the at least one suggestions.

5. The method of claim 1, wherein the implicit feedback is determined from at least one of time spent looking at the suggestions, a number of suggestions selected, relevance of the selected suggestions and number of approvals or disapprovals of the selected suggestions.

6. The method of claim 1, further comprising generating a user interface that includes a sliding scale for the user to specify the first setting.

7. The method of claim 1 wherein a probability of straying by a certain amount from the relevant choice is an inverse exponential function.

8. The method of claim 1, wherein the implicit feedback is normalized based on previous counts of implicit feedback received.

9. A system comprising:
   one or more processors;
   a user activity processing unit stored on a memory and executable by the one or more processors, the user activity processing unit configured to identify a plurality of user interests from user activity associated with a user, apply a weight to each of the user interests based on a frequency of user activity related to each of the user interests and to generate groups on a social network for the user, at least a first group from the set of the groups including a user interest;
   a recommendation engine stored on the memory and executable by the one or more processors, the recommendation engine coupled to the user activity processing unit and configured to generate a query for content for the first group that includes the user interest and to receive the content for the first group;
   a ranking engine stored on the memory and executable by the one or more processors, the ranking engine coupled to the recommendation engine and configured to generate a set of ranked suggestions from the content for the first group based on relevancy to the user interest, the weight of the user interest and explicit feedback from the user, the explicit feedback including a first setting for how much the user wants a suggestion to stray from a center point of relevant choices, the first setting being different from a second setting provided by the user for a second group from the set of groups; and a simulated annealing engine stored on the memory and executable by the one or more processors, the simulated annealing engine coupled to the ranking engine and configured to provide at least one first suggestion from the set of ranked suggestions to the user, to receive implicit feedback from the user in response to providing the at least one first suggestion, the implicit feedback including positive feedback and responsive to receiving the positive feedback, to provide at least one second suggestions from the set of ranked suggestions for the user that stray from the center point of relevant choices for the user.

10. The system of claim 9 wherein the implicit feedback is negative feedback from the user based on the at least one first suggestion and responsive to receiving the negative feedback, the simulated annealing engine provides at least one second suggestion for the user that is closer to the center point of relevant choices for the user.

11. The system of claim 9 wherein the query for content includes the user interest and a level of relevancy for the content as compared to the user interest.

12. The system of claim 9 wherein the set of ranked suggestions is also based on at least one of a recency of user interests, frequency of actions associated with the user interests and social affinity of the user to other users that generated any of the at least one suggestions.

13. The system of claim 10 wherein the implicit feedback is determined from at least one of time spent looking at the suggestions, a number of suggestions selected, relevance of the selected suggestions and a number of approvals or disapprovals of the selected suggestions.

14. The system of claim 10 further comprising a graphical user interface (GUI) engine generating a user interface that includes a sliding scale for the user to specify the first setting.

15. A computer program product stored on a non-transitory computer readable medium including a computer readable program, wherein the computer readable program when executed on a computer causes the computer to:

identify a plurality of user interests from user activity associated with a user;

apply a weight to each of the user interests based on a frequency of user activity related to each of the user interests;

generate groups on a social network for the user, at least a first group from the set of the groups including a user interest;

generate a query for content for the first group that includes the user interest;

receive the content for the first group;

generate a set of ranked suggestions from the content for the first group based on relevancy to the user interest, the weight of the user interest and explicit feedback from the user, the explicit feedback including a first setting for how much the user wants a suggestion to stray from a center point of relevant choices, the first setting being different from a second setting provided by the user for a second group from the set of groups;

provide the at least one first suggestion from the set of ranked suggestions to the user;

receive implicit feedback from the user in response to providing the at least one first suggestion, the implicit feedback including positive feedback; and responsive to receiving the positive feedback, provide at least one second suggestion from the set of ranked suggestions for the user that stray from the center point of relevant choices for the user.

16. The computer program product of claim 15, wherein the implicit feedback is negative feedback from the user based on the at least one first suggestion and responsive to receiving the negative feedback, providing the at least one second suggestion for the user that is closer to the center point of relevant choices for the user.

17. The computer program product of claim 15 wherein the query for content includes the user interest and a level for the content as compared to the user interest.

* * * * *